Jan. 22, 1929.
J. A. ZUBLIN
PACKING RING
Filed Jan. 25, 1923
1,700,012
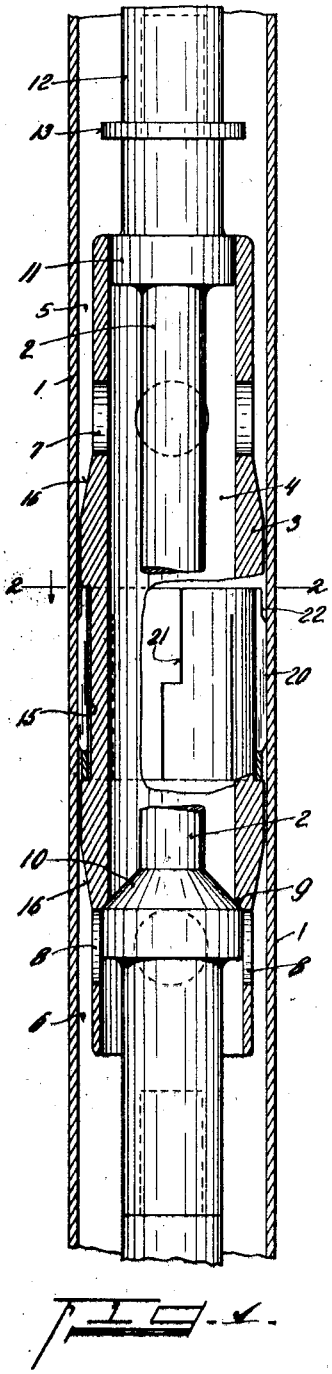
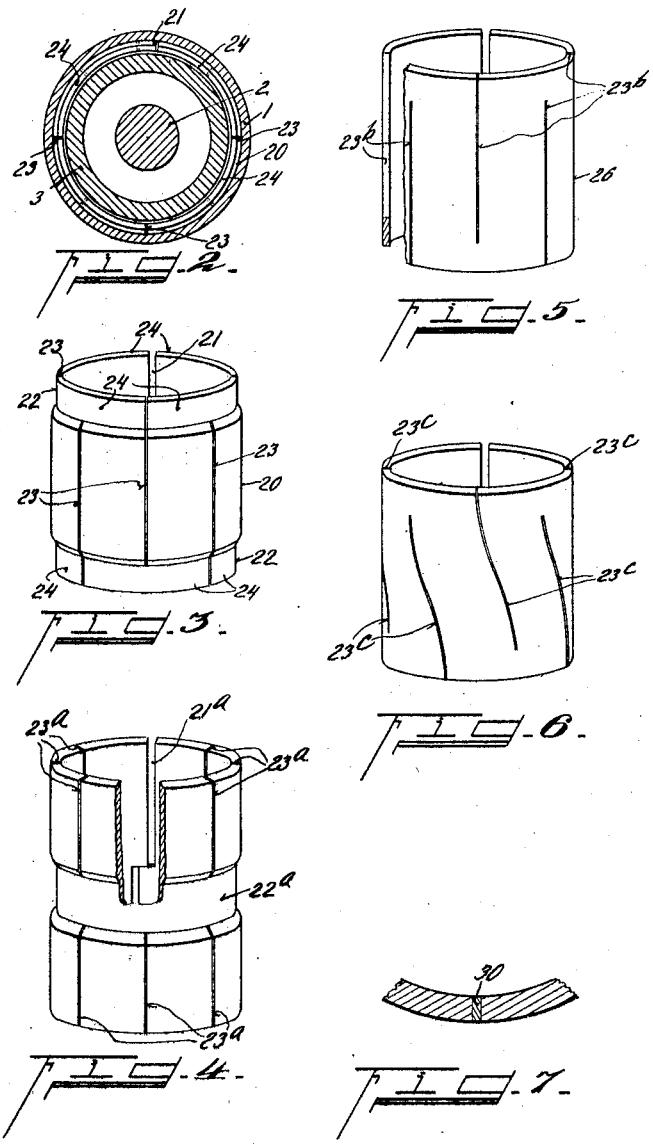
INVENTOR
John A. Zublin
BY
Clarence B. Foster, ATTORNEY Patented Jan. 22, 1929.

1,700,012

UNITED STATES PATENT OFFICE.

JOHN A. ZUBLIN, OF LOS ANGELES, CALIFORNIA.

PACKING RING.

Application filed January 25, 1923. Serial No. 614,775.

This invention relates to a packing ring, and is particularly directed to an improved packing ring structure of a flexible nature which is especially adapted for use as a piston packing.

It is an object of the invention to provide a packing structure capable of serving as a packing for a pump plunger which is adapted for operation in undersized well tubing or an undersized pump barrel, the packing being automatically expansible to engage the tubing walls and slit to increase its flexibility.

Another object is to provide a one piece split packing ring structure which is longitudinally slit to increase its flexibility and which has a normal diameter greater than that of the tubing or barrel in which it is to operate so as to automatically expand against the walls of such tubing or barrel.

A further object is to provide a packing ring for a pump plunger adapted to operate in undersized well tubing and having a packing wall of greater thickness than the clearance space between said plunger and tubing and a portion of reduced diameter to provide a wall portion of lesser thickness, the packing wall being longitudinally slit at spaced intervals so that the flexibility of the packing ring as a whole is not less than that of the thinner wall portion.

Various other objects and advantages will be more fully apparent from the accompanying drawings which form a part of this disclosure, and which illustrate a preferred form of embodiment of the invention.

Of the drawings:

Figure 1 is a vertical section through a well tubing and pump unit showing a packing ring of the present invention associated with the plunger.

Figure 2 is a plan section on line 2—2 of Figure 1.

Figure 3 is a detail perspective view of the ring shown in Figures 1 and 2.

Figure 4 is a perspective view, partly broken, of a modified form of ring structure.

Figures 5 and 6 are perspective views showing other modifications.

Figure 7 is a detail section showing one of the ring slits containing a filler.

Referring particularly to Figures 1 and 2, the packing ring structure of the present invention is shown associated with a fluid pump adapted for reciprocation in a working barrel or pump tubing 1 of an oil well, the pump unit including a special sucker rod section 2 as part of the sucker rod line, and a tubular pump piston or plunger 3 which surrounds the rod section 2 and forms therewith an annular fluid passage 4. The opposite ends of the plunger are of reduced diameter and with the tubing walls form annular fluid passages 5 and 6, the upper end portion of the plunger having ports 7 establishing communication between the fluid passage 5 and the bore 4 of the plunger, and the lower end portion of the plunger having similar ports 8 establishing communication between the fluid passage 6 and said plunger bore.

The bore 4 is enlarged at its lower end and immediately above the ports 8 is formed to provide an annular valve seat 9, and the sucker rod section 2 has a cone valve 10 which has a sliding fit in said enlarged portion of the bore and is adapted for cooperation with the valve seat to control the central fluid passage. The rod section 2 is further provided with a collar 11 having a sliding fit in the upper end of the plunger bore above the ports 7, and the upper end of said rod section has the usual form of standard threaded pin to engage in the upper adjacent standard sucker rod section 12, a stop abutment washer 13 being clamped in position between the two rod sections 2 and 12.

In the operation of a pump of this construction the sucker rod has an initial movement independent of the pump plunger so that during a downward movement of the sucker rod, the valve 10 will be opened and the abutment 13 will then engage and translate the pump plunger, and during an upward movement will close said valve and then translate the pump plunger upwardly in a pumping stroke.

The medial portion of the plunger 3 is provided with a packing groove 15 to receive the packing structure and the periphery of the plunger from said medial portion to the reduced end portions is tapered as at 16 to promote an easy insertion of the pump unit into the pump tubing.

The pump unit is shown operating in a well tubing, and in such use is not intended to closely fit the tubing as it is desired to provide a pump unit which may be inserted and operated in any standard tubing of a given size and because of the fact that standard tubing of different makes and weights vary considerably in internal diameter.

This pump construction forms the subject matter of an application entitled "Well pump," filed on even date herewith, to which reference may be had for a more detailed description and illustration.

A packing ring suitable for efficient service in a pump of this character must be capable of being collapsed sufficiently for insertion into undersized tubing and at the same time it must also be capable of expanding to contact the walls of oversized tubing, and must, especially when used in oversized tubing, have sufficient wall thickness so as not to be liable to become wedged in the clearance space between the tubing wall and the undersized pump tubing.

Further as the automatic expanding of the packing ring besides compensating for differences in the diameter of the tubing must also compensate for wear it will be evident that the packing wall of the ring must be of substantial thickness; and when the pump is used in deep oil wells where it operates under high pressures, it will be understood that were the packing constructed of relatively soft material such as rubber, leather and the like, it would be very liable to be blown out through the clearance space between the tubing and plunger.

With due regard for these circumstances, I have constructed a packing ring of relatively hard non-compressible metal calculated to have a high resistance against abrasive wear and of sufficient strength to resist any tendency to being forced out of place by pressure, and at the same time to be of such resiliency as to permit its easy installation in a well tubing and a free and easy expanding action against the tubing wall.

The packing ring illustrated in Figures 1 to 3 comprises a cylindrical ring 20 longitudinally split as at 21, and having its end portions turned down, as at 22, to provide a medial packing wall of substantial thickness and end wall portions which are considerably thinner.

The ring is longitudinally slit alternately from opposite ends, as at 23, with each slit extending through the medial packing wall to the thinner end portions of the ring, so that the ring will have a greater degree of flexibility, such flexibility being equal to that of the several thin end sections 24. This in effect, provides a ring in which the packing wall is divided into sections with the thinner end sections joining or connecting the adjacent packing wall sections alternately in pairs.

By thus forming the ring I provide a packing ring structure which has a packing wall portion of substantial thickness and which may be formed of relatively hard metal, such as case hardened steel, and at the same time will be so flexible or resilient as to be quite easily collapsed manually for insertion into a well tubing. It is intended that the ring be formed to exert an outward pressure against the tubing wall, the detail view, Figure 3, showing the ring in normal condition with the split 21 to some extent open.

It will be observed that the packing wall is of sufficient thickness to span the clearance space between the plunger and the tubing wall with the thinner end portions of the ring remaining within the packing groove of the plunger. This precludes any possibility of the ends of the ring becoming wedged in said clearance space and provides a slit ring which while formed to have a thick packing wall to span a substantial clearance between the tubing and plunger will, at the same time, have a flexibility or resiliency equal to that of the thinner end portions which connect the several packing wall sections together.

In Figure 4 I have illustrated a modified form of structure which is longitudinally split, as at 21ª and in which the medial portion is turned down to provide a relatively thin connecting wall 22ª, the opposite end portions 20ª providing packing walls of greater thickness each of which are longitudinally slit, as at 23ª, with the several slits extending inwardly to the thinner wall 22ª. In this construction the resiliency or flexibility of the ring is equal to that of the connection wall 22ª.

The packing ring 26 shown in Figure 5 is of uniform thickness throughout, with the slits 23ᵇ alternately extending inwardly from opposite ends to within a relatively short distance from the opposed end.

In Figure 6 the ring is similar to that shown in Figure 5, with the exception that the slits 23ᶜ are spirally disposed.

It may in some cases be desirable to place a suitable filler in the several slits of either of the above described structures, as indicated at 30 in Figure 7. A filler for this purpose will preferably be formed of a compressible material, such for instance as fibre, so as not to appreciably effect the flexibility of the ring as a whole.

While the ring structures herein shown and described are well adapted to fulfill the objects primarily stated, it is to be understood that the invention is not to be limited to the embodiments herein disclosed, for it is susceptible of embodiment in various other forms, all coming within the scope of the claims which follow.

I claim:

1. A reciprocating pump packing structure adapted to encircle a pump plunger and reciprocate therewith, said structure comprising: a split resilient ring having a thin tubular section formed integral with a slitted thick tubular section and end to end therewith, said thin section being free to expand radially a degree commensurate with its thickness owing to the formation of slits in said thick section which extend through said thick section to said thin section.

2. A reciprocating pump packing structure adapted to encircle a pump plunger and reciprocate therewith, said structure comprising: a split resilient ring having a thin tubular section formed integral with slitted thick tubular sections disposed at the opposite ends of said thin section, said thin section being free to expand radially a degree commensurate with its thickness owing to the formation of slits in said thick sections which extend through said thick sections to said thin section.

3. A reciprocating pump packing structure adapted to encircle a pump plunger and reciprocate therewith, said structure comprising: a split resilient ring having a thin tubular section formed integral with a slitted thick tubular section and end to end therewith, said thin section being free to expand radially a degree commensurate with its thickness owing to the formation of slits in said thick section which extend through said thick section to said thin section; and fillers disposed in said slits.

4. A reciprocating pump packing structure adapted to encircle a pump plunger and reciprocate therewith, said structure comprising: a split resilient ring having a thin tubular section formed integral with slitted thick tubular sections disposed at the opposite ends of said thin section, said thin section being free to expand radially a degree commensurate with its thickness owing to the formation of slits in said thick sections which extend through said thick sections to said thin section; and fillers disposed in said slits.

Signed at Los Angeles, California, this 17th day of January, 1923.

JOHN A. ZUBLIN.